(12) United States Patent
Zeinlinger et al.

(10) Patent No.: US 8,575,816 B2
(45) Date of Patent: Nov. 5, 2013

(54) COOLANT COMPRESSOR

(75) Inventors: Helmut Zeinlinger, Stellberg (AT); Hans Peter Schoegler, Fehring (AT)

(73) Assignee: ACC Austria GmbH, Fuerstenfeld (AT)

( * ) Notice: Subject to any disclaimer, the term of this patent is extended or adjusted under 35 U.S.C. 154(b) by 778 days.

(21) Appl. No.: 12/451,776

(22) PCT Filed: Jun. 2, 2008

(86) PCT No.: PCT/EP2008/056782
§ 371 (c)(1),
(2), (4) Date: Nov. 30, 2009

(87) PCT Pub. No.: WO2008/145760
PCT Pub. Date: Dec. 4, 2008

(65) Prior Publication Data
US 2010/0119388 A1 May 13, 2010

(30) Foreign Application Priority Data
May 31, 2007 (AT) .............................. GM 346/2007

(51) Int. Cl.
*H02K 3/46* (2006.01)
*F04B 17/00* (2006.01)

(52) U.S. Cl.
USPC .......................... 310/260; 417/415; 310/214

(58) Field of Classification Search
USPC .............. 417/415, 420, 410.1, 902; 310/214, 310/260, 270
See application file for complete search history.

(56) References Cited

U.S. PATENT DOCUMENTS

| | | | | | |
|---|---|---|---|---|---|
| 3,378,711 | A | * | 4/1968 | Swanke | 310/260 |
| 3,663,127 | A | * | 5/1972 | Cheers | 417/372 |
| 4,335,325 | A | * | 6/1982 | Miller et al. | 310/214 |
| 4,403,162 | A | * | 9/1983 | Pallaro | 310/194 |
| 4,765,054 | A | * | 8/1988 | Sauerwein et al. | 29/596 |
| 5,331,240 | A | * | 7/1994 | Hyodo | 310/71 |
| 5,508,571 | A | * | 4/1996 | Shafer, Jr. | 310/71 |
| 5,717,273 | A | * | 2/1998 | Gulbrandson et al. | 310/260 |
| 5,957,671 | A | * | 9/1999 | Outzen | 417/410.1 |
| 6,043,584 | A | * | 3/2000 | DeHart | 310/260 |
| 7,936,116 | B2 | * | 5/2011 | Asou et al. | 310/410 |
| 8,125,118 | B2 | * | 2/2012 | Nissen | 310/260 |

FOREIGN PATENT DOCUMENTS

| | | |
|---|---|---|
| CH | 587 579 | 5/1977 |
| DD | 123 252 | 12/1976 |
| DE | 29 51 864 | 7/1981 |
| JP | 2000-232746 | 8/2000 |
| JP | 2003-097440 | 4/2003 |

* cited by examiner

*Primary Examiner* — Peter J Bertheaud (57) ABSTRACT

A refrigerant compressor has a compressor housing in which a cylinder housing and an electric motor are fastened to one another. The electric motor includes a stator provided with a stator bore, the coil core of which is provided with receiving grooves for accommodating a stator winding having any given number of windings, coil groups, and poles. The coil core is preferably composed of interconnected stator segments and the stator winding in the region of the end faces of the coil core has winding heads which are each situated outside the receiving grooves. The winding heads of the stator winding are pressed against an insulating element which is situated between the coil core and the winding heads and which has an arbitrary number of projecting additional insulating sections in a peripheral edge region opposite the stator bore.

8 Claims, 13 Drawing Sheets

COOLANT COMPRESSOR

CROSS REFERENCE TO RELATED APPLICATIONS

This application is the National Stage of PCT/EP2008/056782 filed on Jun. 2, 2008, which claims priority under 35 U.S.C. §119 of Austrian Application No. GM 346/2007 filed on May 31, 2007. The international application under PCT article 21(2) was not published in English.

The invention relates to a refrigerant compressor having a compressor housing having a piston which compresses a refrigerant in which a cylinder housing and an electric motor which drives the piston are fastened to one another, the electric motor comprising a stator provided with a stator bore, the coil core of which is provided with a plurality of receiving grooves for accommodating a stator winding having any given number of windings, coil groups, and poles, wherein the coil core is preferably composed of a plurality of interconnected stator segments and wherein the stator winding in the region of the end faces of the coil core has winding heads which are each situated outside the receiving grooves, at least one end face of the coil core being provided with an insulating element which essentially covers the end face and which insulates the winding heads of the stator winding situated on this at least one end face with respect to the coil core, wherein the insulating element has an arbitrary number of projecting additional insulating sections in a peripheral edge region opposite the stator bore which insulate the winding heads of the stator winding situated on the at least one end face with respect to adjacent sections of the cylinder housing, in particular with respect to flange extensions of the cylinder housing which may be attached to the coil core.

A generic electric motor has a stator with a grooved coil core in which any given number of winding phases of the stator winding are accommodated in order to induce a voltage in a rotor which is rotatable within the stator. Attached to the stator is a cylinder housing in which a crankshaft which is driven by the rotor is supported. A connecting rod which is articulatedly connected to a cylinder piston is actuated via the crankshaft in a known manner, the connecting rod causing an oscillating motion of the cylinder piston and thus compressing a refrigerant which is drawn into the cylinder housing.

For starting the electric motor, which preferably is designed as a single phase asynchronous motor, in addition to a main field winding a second, spatially offset auxiliary field winding is usually provided on the stator which generates a magnetic field which is phase-shifted in time relative to the main field winding. The main field and auxiliary field windings form the stator winding. In order to generate a rotary field in the stator and to induce a voltage in the rotor which is responsible for the rotational motion of the rotor, the alternating fields generated in the main field winding and auxiliary field winding must be spatially and temporally offset from one another. The rotary field rotational speed results from the power supply frequency and the number of poles. After reaching a specified rotor operating speed the auxiliary winding may be shut off using a suitable switch, current-dependent relay, or other components having an appropriate function.

The stator coil core is typically formed from numerous sheet metal segments stacked one above the other and joined together by attachment means or screw elements. These stator segments have any given number of receiving grooves, in many cases 24, for example, which are defined by a corresponding number of segment teeth. In the center of the coil core or the stator segments is provided a stator bore, i.e., a rotationally symmetrical recess, which accommodates the rotor and which is defined by the end regions of the spoke-shaped segment teeth facing the stator bore axis.

The windings or winding stacks of the stator winding are mounted in the differently sized receiving grooves in the coil core or the stator segments. The main and auxiliary field windings are usually situated on the coil core in the form of two coil groups which each have a predetermined number of windings. To avoid stator short circuits in the winding wires the receiving grooves are provided with insulating pads made of polyethylene, for example.

In the course of the winding process for the stator winding, relatively large-volume winding heads result in the region of the end faces of the coil core which increase the installation length of the stator and thus of the refrigerant compressor housing.

To reduce the volume of the winding heads, it is currently known to compress the winding heads using suitable devices. In this manner the winding heads are stabilized, cavities between the individual winding wires are minimized, and the volume of the winding heads is reduced.

Between the coil core or the core stack formed from the stator segments and the winding heads an air gap is always provided in the installed position which must be large enough that no contact occurs between the rotor and the stator, in particular during run-up.

However, since the winding heads are necessarily separated at a distance from the coil core or the stator segments, the electric motor has larger dimensions and valuable space is lost in the compressor housing.

A further disadvantage of known stator systems in refrigerant compressors is that, due to the necessary safety and insulation distance of the winding heads from the metallic cylinder housing that is screwed to the stator, this results in increased space requirements for the electric motor, and thus a correspondingly large cylinder housing and consequently a correspondingly large compressor housing which accommodates the referenced components. These are in particular specially designed flange extensions or "feet" of the cylinder housing which run along the periphery of the winding heads and are screwed to the coil core or the stator segments. Conventional cylinder housings have four, or, if need be only three, flange extensions or "feet" which surround the winding heads and are used for attachment to the stator.

To reliably prevent contact between the winding heads and the core stack, it is known to provide an insulating element therebetween.

It is known from U.S. Pat. No. 5,957,671 B, for example, to attach an insulating mat between winding heads and a cylinder housing. However, this insulating mat does not allow for a more compact design of the winding heads.

It is known from DD 123252 to provide a molded part between a core stack and winding heads which has the function of insulating the winding heads and stator segments from one another. However, the molded part as well prevents a more compact design of such systems.

It is also known from JP 2003097440 to provide additional insulating elements, projecting in an axial direction of the stator bore, between the winding heads and the insulating element situated on the core stack.

However, none of the referenced measures contributes to an appreciable reduction in the height of the winding heads.

The object of the present invention, therefore, is to avoid the referenced disadvantages and to enable the most compact and therefore most space-saving design possible for the winding heads and thus of the electric motor and the adjoining cylinder housing while completely ensuring the insulation protection for the stator winding.

According to the invention these objectives are achieved by use of a refrigerant compressor having the characterizing features of Claim 1.

A generic refrigerant compressor has a preferably hermetically sealed compressor housing in which a cylinder housing and an electric motor which is usually designed as a single phase asynchronous motor are fastened to one another. The electric motor includes a stator provided with a stator bore, the coil core of which is provided with a plurality of receiving grooves for accommodating a stator winding having any given number of windings, coil groups, and poles, wherein the coil core is preferably composed of a plurality of interconnected stator segments and wherein the stator winding in the region of the end faces of the coil core has winding heads which are each situated outside the receiving grooves, at least one end face of the coil core being provided with an insulating element which essentially covers the end face and which insulates the winding heads of the stator winding with respect to the coil core in the operating state of the electric motor, and the insulating element has an arbitrary number of projecting additional insulating sections in a peripheral edge region opposite the stator bore which insulate the winding heads of the stator winding situated on the at least one end face with respect to adjacent sections of the cylinder housing, in particular with respect to flange extensions of the cylinder housing which may be attached to the coil core.

The invention provides that the winding heads of the stator winding are pressed against the insulating element. This results in a large space savings compared to conventional winding heads, and the entire refrigerant compressor has a smaller design. Due to the dielectric interlayer formed by the insulating element, the winding heads may be mounted directly on the coil core or stator segment assembly and brought closer to the coil core. This enables a smaller or more compact design of the electric motor while the performance indicators remain unchanged, and thus allows a significant space savings in the compressor housing, i.e., a smaller design for the compressor housing.

At the same time, the insulation distance between the winding heads and the cylinder housing, in particular the insulation distance between the winding heads and the flange extensions or "feet" of the cylinder housing which may be attached to the stator, may thus be greatly reduced. The electric motor-cylinder housing system may thus have a more compact, i.e., smaller, design while the performance indicators remain unchanged.

In one preferred embodiment of the invention the insulating element essentially has a plate-shaped design. A plate-shaped insulating element is easily fabricated and is suitable for space-saving support on the end face of the coil core provided for this purpose.

In one particularly preferred embodiment, providing the peripheral course of the insulating element so as to be essentially congruent with the peripheral course of the stator segments or the cross-sectional geometry of the coil core (as seen from above or from a viewing direction along the stator bore axis) allows optimal insulation of the entire relevant surface of the coil core or the stator segment facing the winding head.

A further preferred embodiment of the invention provides that the additional insulating sections are situated so as to be movable, preferably foldable, on the insulating element. In this manner the end position of the additional insulating sections may be optimally adapted during installation of the cylinder housing on the electric motor.

In one preferred embodiment a particularly simple and economical production method is obtained when the additional insulating sections are designed as one piece with the insulating element. The additional insulating sections are thus designed, for example, as tab elements which are bent out from the insulating element.

The insulating element or the additional insulating sections are preferably made of polyethylene (PET). PET has a high dielectric strength and thus allows a thin and therefore space-saving design of the insulating element or the additional insulating sections. The insulating element or the additional insulating sections preferably have a layer thickness of <2 mm.

In one preferred embodiment variant of the present invention the cylinder housing has four, three, or two flange extensions which may be fastened or screwed to the coil core, each of which is insulated with respect to the winding heads by a described additional insulating section. In particular when only two cylinder housing flange extensions which may be fastened or screwed to the coil core are provided, this results in a significant savings in production material or screw components compared to known cylinder housings, which usually have four cylinder housing flange extensions which are used for attachment/screwing to the coil core.

The invention is explained in greater detail with reference to one exemplary embodiment. The figures show the following.

Figure 1:
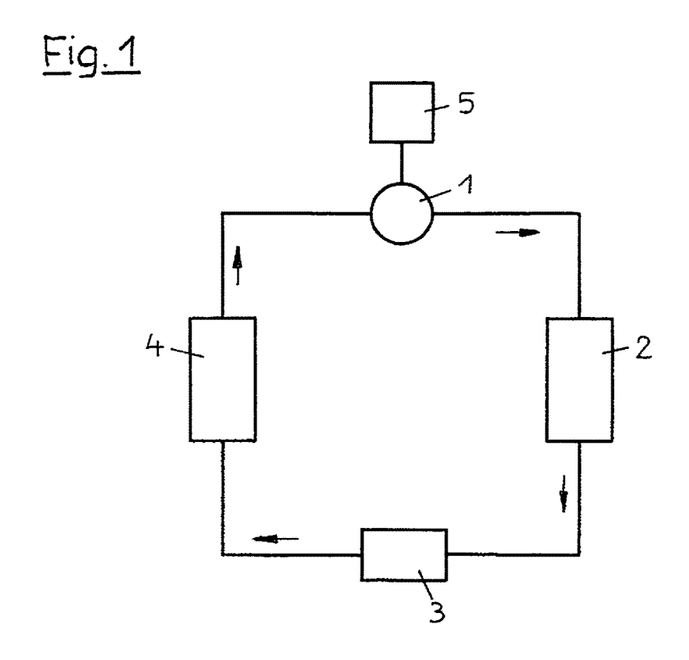
FIG. 1 shows a schematic illustration of a refrigerant circuit.

FIG. 1 schematically illustrates a refrigeration system comprising a hermetically encapsulated refrigerant compressor 1, a condenser 2, an expansion valve 3, and an evaporator 4. The refrigerant compressor 1 is driven by an electric motor 5 which is designed as a single phase asynchronous motor and is situated in a preferably hermetically encapsulated compressor housing for the refrigerant compressor 1.

Such a refrigeration system is well known: the refrigerant compressor 1 compresses a gaseous refrigerant which is supplied by the evaporator 4 of a piston/cylinder unit. The pressure and temperature increase when the refrigerant is compressed. As a result, the refrigerant is converted to a liquid state in the condenser 2, and ultimately is supplied via the expansion valve 3 to the evaporator 4, where it evaporates. The heat of evaporation necessary for this purpose is withdrawn from the surroundings, i.e., a cooling chamber, which is thereby cooled. Lastly, the gaseous refrigerant from the evaporator 4 is once again passed into the refrigerant compressor 1 and undergoes a new compression and expansion cycle.

Figure 2:
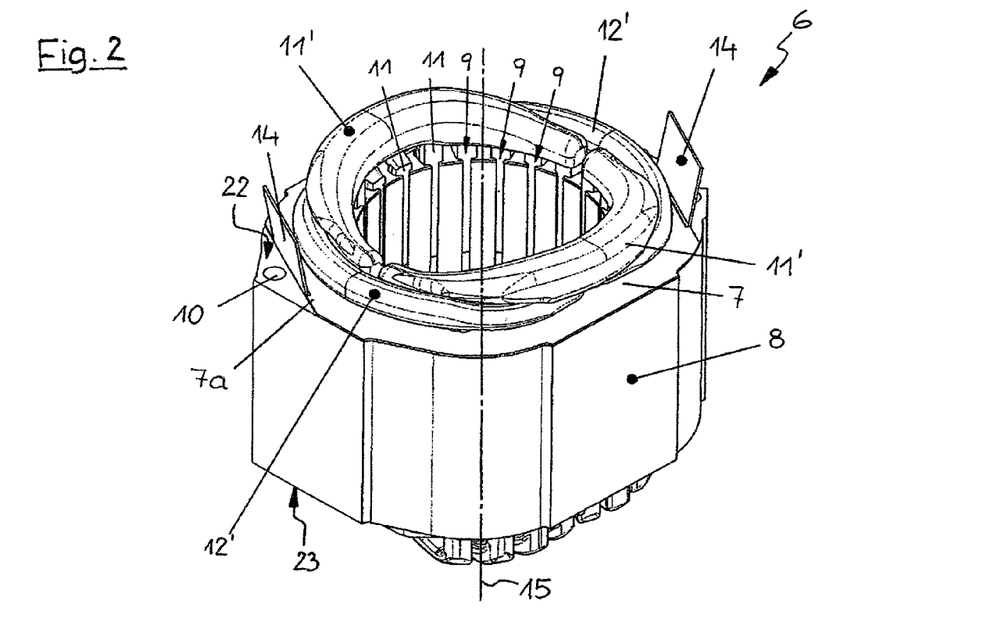
FIG. 2 shows a stator in an oblique view (with additional insulating elements)
Figure 13:
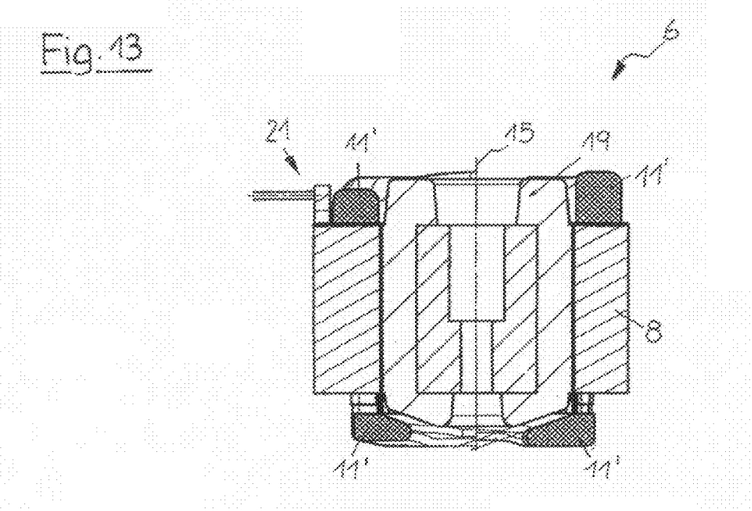
FIG. 13 shows a schematic illustration of a stator provided with a rotor, in a sectional view.

FIG. 2 shows a stator assembly for the electric motor 5 according to the invention; for better clarity a rotor 19 which is situated inside the stator 6 and is rotatable about a stator bore axis 15 is omitted in the illustration (a rotor 19, integrated into the stator assembly, which is not essential to the invention in the present context is schematically illustrated in FIG. 13).

Figure 6:
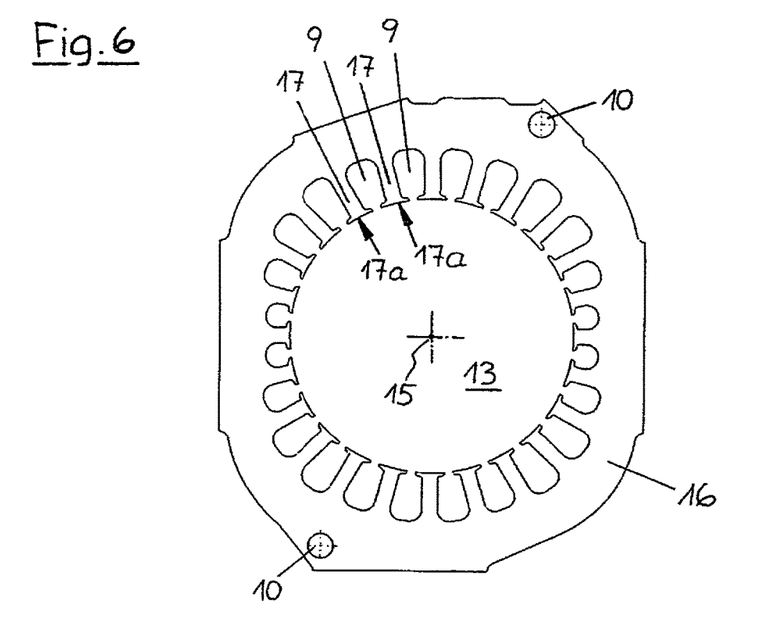
FIG. 6 shows a stator segment in a top view.

The stator 6 includes a coil core 8 which is provided with receiving grooves 9, and through the center of which a stator bore 13 passes which is spatially defined by the end regions 17a of a plurality of segment teeth 17 (see FIG. 6). The receiving grooves 9 of the coil core 8, which likewise are defined by the geometry of the segment teeth 17 and are grouped in a circle around the stator bore 13 or the stator bore axis 15, accommodate winding stacks of a stator winding composed of a main field winding 11 and an auxiliary field winding 12.

To prevent eddy currents the coil core 8 is made of numerous iron sheets, i.e., stator segments 16, which are stacked one above the other in a known manner and are joined together by attachment means which may be passed through receiving holes 10. However, the coil core 8 may also be designed as a solid iron core. To avoid stator short circuits in the winding wires the receiving grooves 9 in the coil core 8 are provided with insulating pads (not illustrated).

The winding stacks for the stator windings 11, 12 are made of self-bonding wire which in addition to enamel insulation has a further thermosetting layer which bonds the individual wires of the winding stacks together after heating to a specified baking temperature in order to stabilize the winding stacks. Of course, conventional winding insulation may be provided using impregnating varnishes or resins.

Although the main field winding 11 and auxiliary field winding 12 are each designed in the form of two double-pole windings situated on the coil core 8 in the present exemplary embodiment, it is noted that in principle the motor 5 may have any given number of coil groups or poles. The auxiliary winding 11 [sic; 12] in conjunction with the main field winding 12 [sic; 11] which is spatially offset thereto causes the rotor 19 to rotate around the stator bore axis 15 as the result of voltage induction from the stator magnetic field, and to accelerate in a generally known manner.

Figure 3:
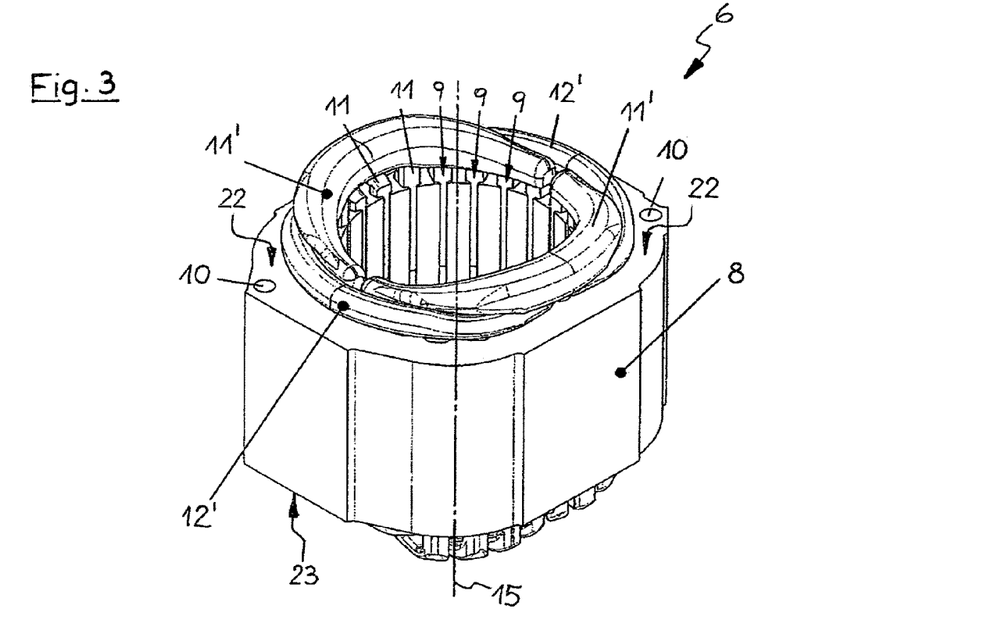
FIG. 3 shows a stator in an oblique view (without additional insulating elements)
Figure 18:
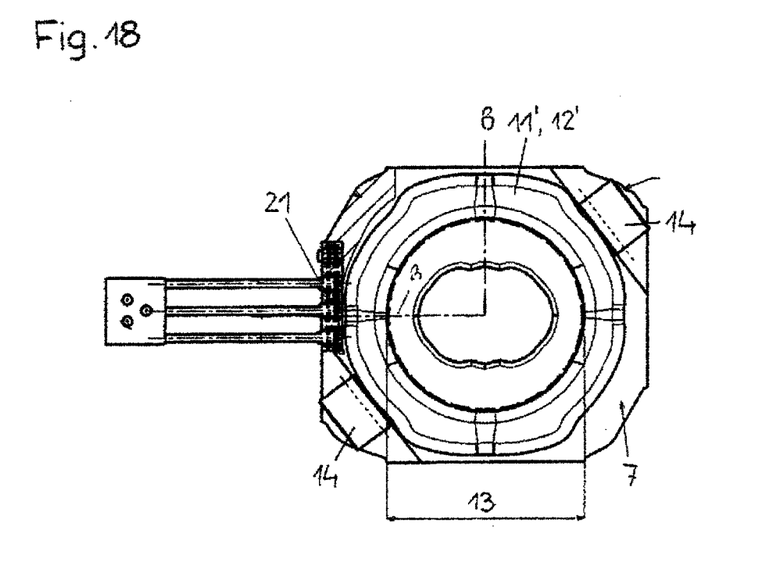
FIG. 18 shows a stator provided with an insulating element and two additional insulating sections, in a top view (without the cylinder housing)

As shown in FIGS. 2 and 3, the stator 6 or the coil core 8 thereof has two essentially flat end faces 22, 23, beyond which the winding phases of the main field and auxiliary field windings 11, 12, also referred to as winding heads 11', 12', project with a certain excess length. FIG. 18 schematically indicates a supply device 21 which connects the main field and auxiliary field windings 11, 12 to an alternating current system in a known manner.

Figure 9:
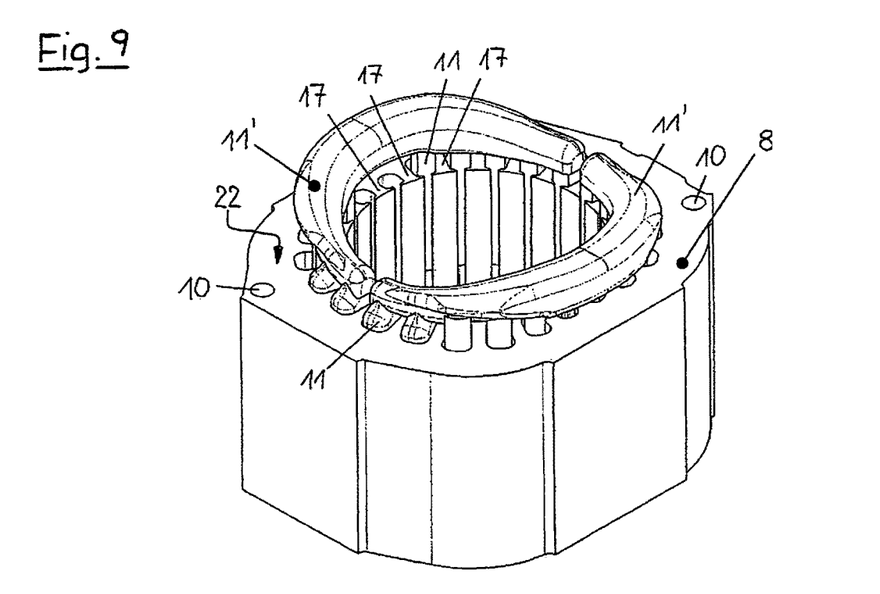
FIG. 9 shows a stator provided with a main field winding, in an oblique view (with the auxiliary field winding concealed)
Figure 10:
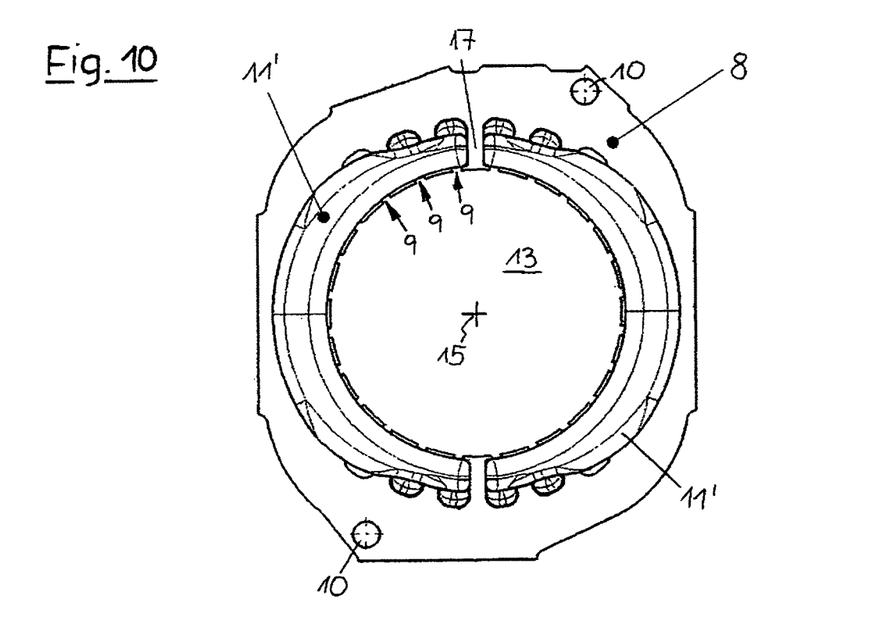
FIG. 10 shows a stator provided with a main field winding, in a top view (with the auxiliary field winding concealed)
Figure 11:
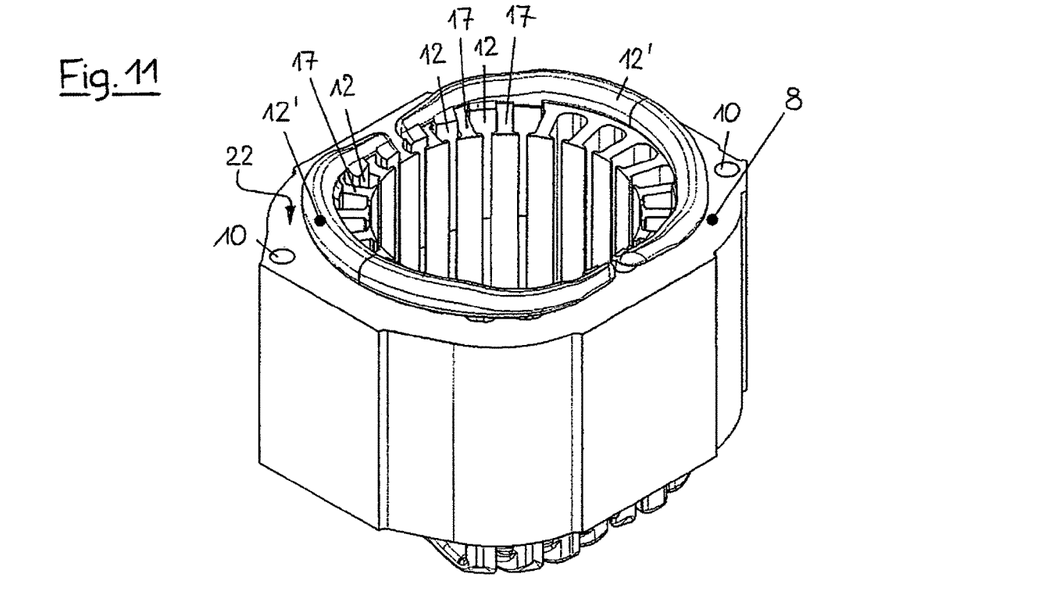
FIG. 11 shows a stator provided with an auxiliary field winding, in an oblique view (with the main field winding concealed)
Figure 12:
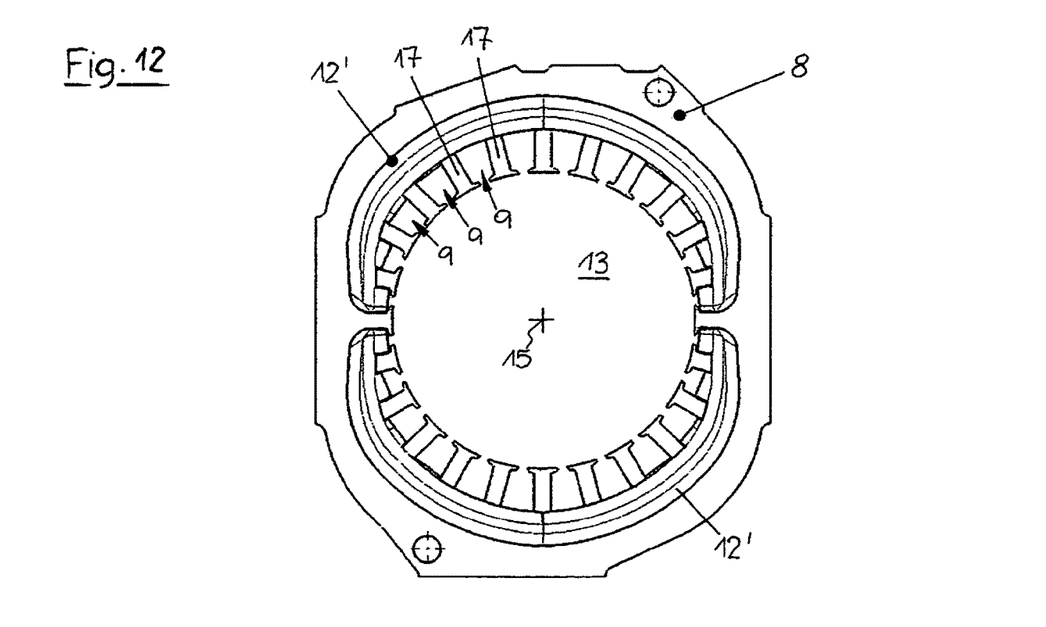
FIG. 12 shows a stator provided with an auxiliary field winding, in a top view (with the main field winding concealed)

To provide a better understanding of the configuration of the main field and auxiliary field windings 11, 12 on the stator 6, FIGS. 9 and 10 show a main field winding 11 mounted on the coil core 8 in an oblique view and a top view, respectively, with the complementary auxiliary field winding 12 omitted. Analogously, FIGS. 11 and 12 show an auxiliary winding 12 mounted on the coil core 8 in an oblique view and a top view, respectively, with the main field winding 11 omitted.

Figure 4:
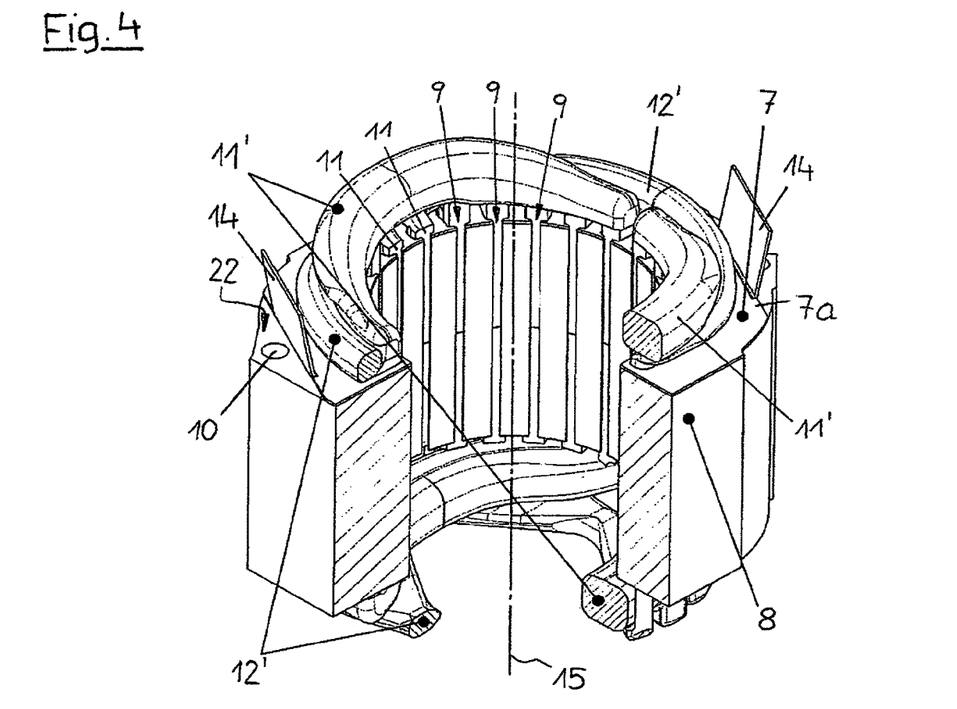
FIG. 4 shows a stator according to the invention in a partially cutaway axonometric view.
Figure 14:
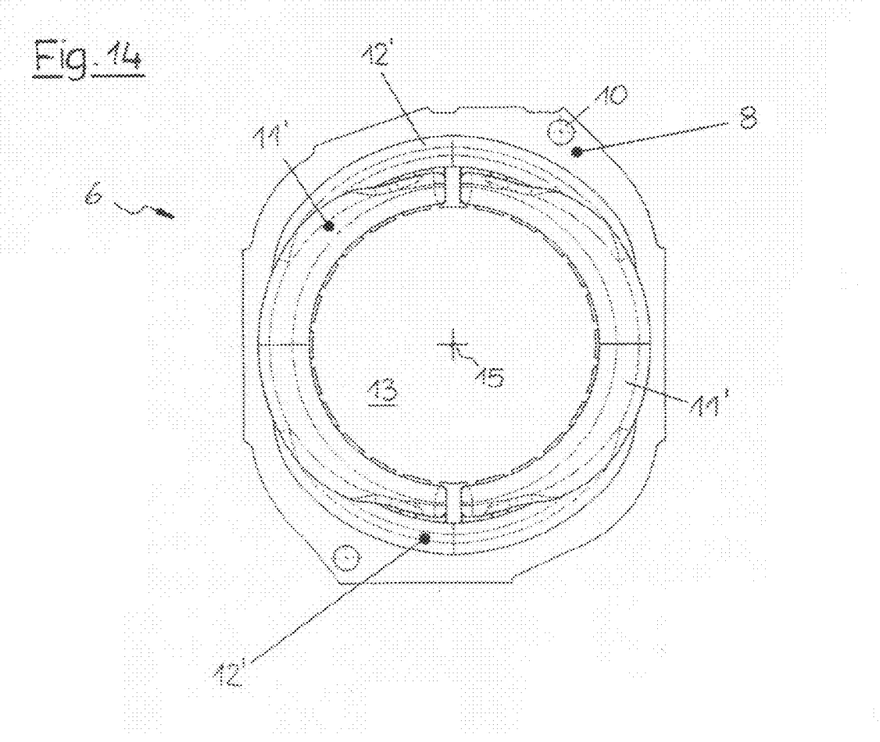
FIG. 14 shows a completely wound stator having main field and auxiliary field windings, in a top view.

FIG. 4 shows a completely wound stator 6 illustrated in a partial sectional view (also see a corresponding top view according to FIG. 14).

Figure 15:
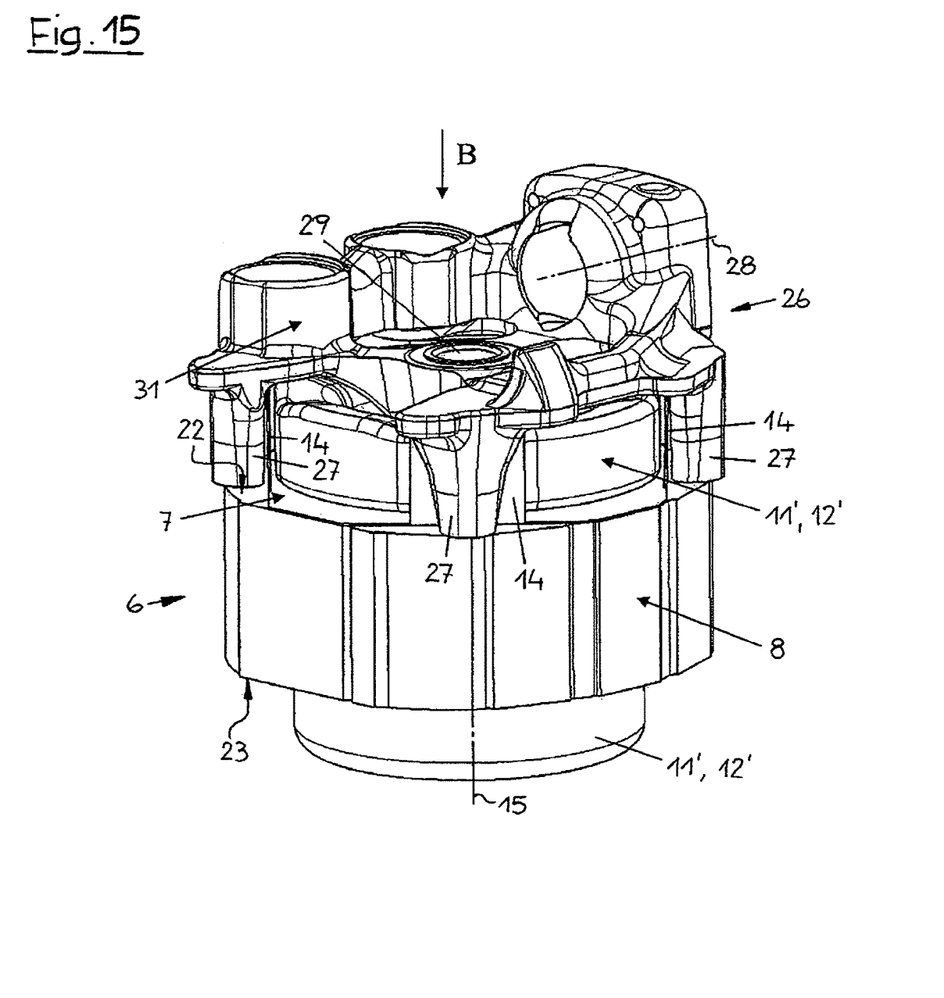
FIG. 15 shows a cylinder housing provided on the stator, in an oblique view.
Figure 16:
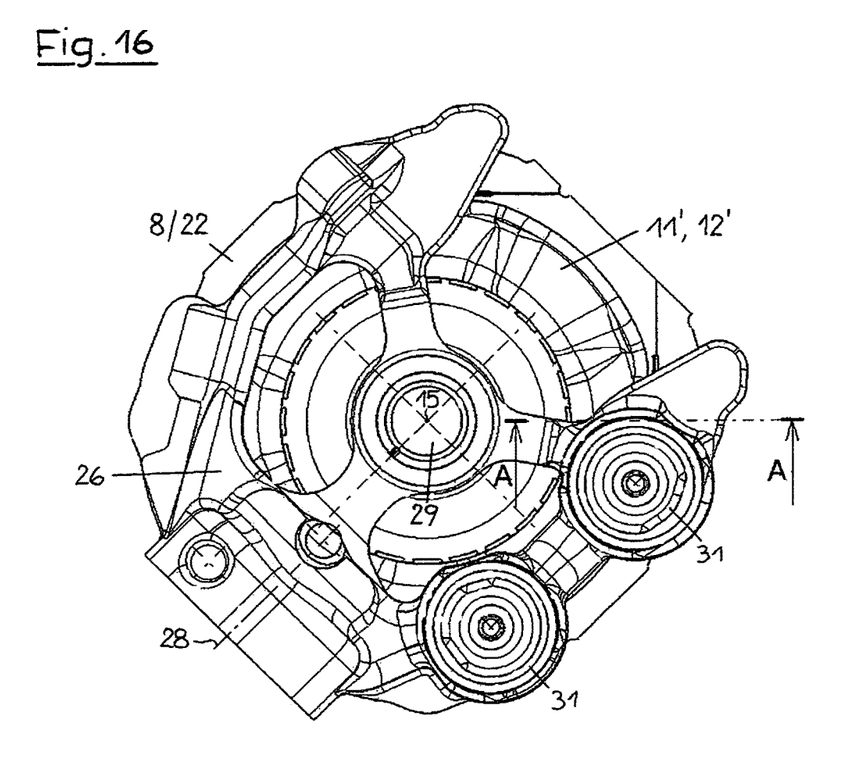
FIG. 16 shows a cylinder housing provided on the stator, in a top view according to viewing direction "B" from FIG. 15.

Fastened to the stator 6, which is wound in the described manner, is a cylinder housing 26, illustrated in FIGS. 15 and 16, in which a crankshaft (not illustrated) that is driven by the rotor 19 is supported in a bearing region 29. The rotor 19 typically has a magnetic core and a cage winding, and via the crankshaft drives a piston connecting rod (likewise not illustrated) which in turn causes a linear motion of a cylinder piston along a cylinder axis 28 and thus brings about compression of a refrigerant which is drawn into the cylinder housing 26.

Figure 17:
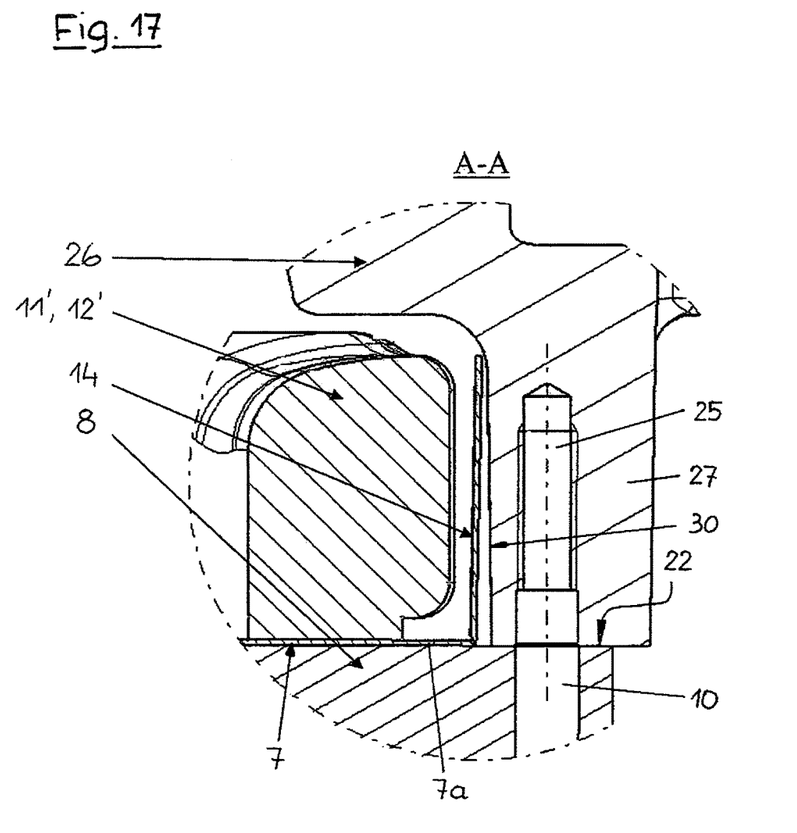
FIG. 17 shows a detailed illustration of an insulating element together with an additional insulating section according to section line A-A from FIG. 16.

It is noted that the cylinder housing 26, which in the present exemplary embodiment according to FIG. 15 has pressurized acoustic chambers 31 and is mounted on the upper end face 22 of the stator 6, may also be situated on the lower end face 23 of the stator 6. In such a design scenario the cylinder housing 26 illustrated in FIG. 15 would be visualized as the mirror image below a horizontal axis, adjoining the lower stator end face 23. It is further understood that the cylinder housing 26 shown in FIGS. 15 through 17 is illustrated by way of example only, and in the present context may also have a completely different design; in particular the pressurized acoustic chambers 31 may be dispensed with.

The attachment means or screw elements which pass through the receiving holes 10 of the stator segments 16 are supported on the end face of the coil core 8 facing the cylinder housing 26, and thus in the present exemplary embodiment on the lower end face 23, in a suspension device known as such. The suspension device usually constitutes compression spring elements which engage with pins or bearing bushes (not illustrated) situated at the base of the compressor housing.

Regardless of the particular design variant, specially designed flange extensions or "feet" 27 of the cylinder housing 26 are provided which run along the periphery of the particular winding heads 11', 12' and which are screwed or otherwise connected to the coil core 8 or the stator segments 16. According to FIG. 17, each cylinder housing flange extension 27 has a borehole 25 whose axis is aligned with the axis of a corresponding receiving hole 10 in the coil core 8 or in the stator segments 16. A screw element (not illustrated) may be passed through the receiving hole 10 and screwed into the blind borehole 25 by means of a thread section.

Figure 5:
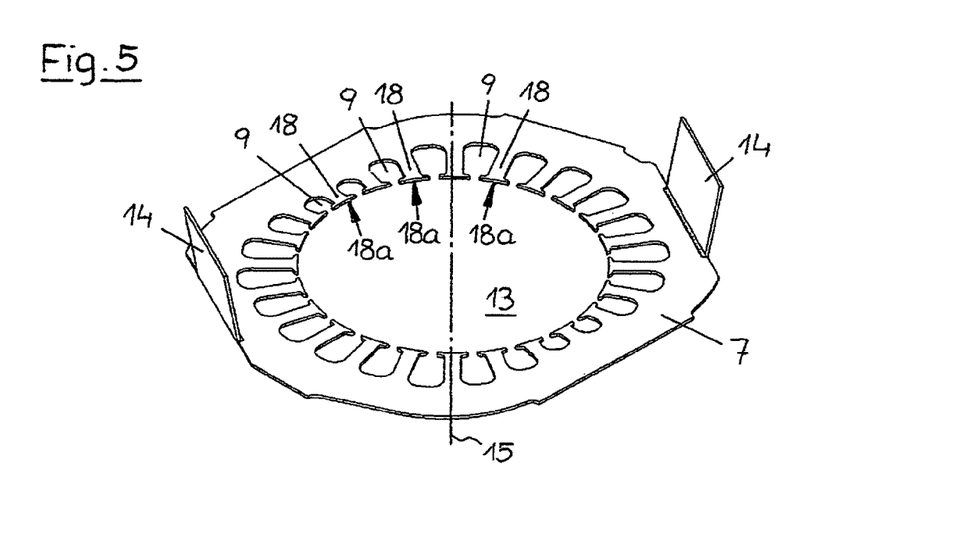
FIG. 5 shows an insulating element which may be mounted on the end faces of the stator, in an oblique view.

In order to insulate the winding heads 11', 12' with respect to the coil core 8 and to allow them to be pressed against same according to the invention, an essentially plate-shaped insulating element 7, illustrated in FIG. 5, is provided on at least end face 22, 23 of the coil core 8. The insulating element 7, which is preferably made of a plastic such as PET and has a layer thickness of approximately 1.7 mm, essentially covers the respective end face 22, 23 of the coil core 8 in the operating state of the electric motor 5, and thus insulates the winding heads 11', 12' of the stator winding from the coil core 8.

Pressing the winding heads 11', 12' against the insulating element 7 according to the invention thus allows a reduction in the axial length of the electric motor-cylinder housing system and a more compact design.

Figure 7:
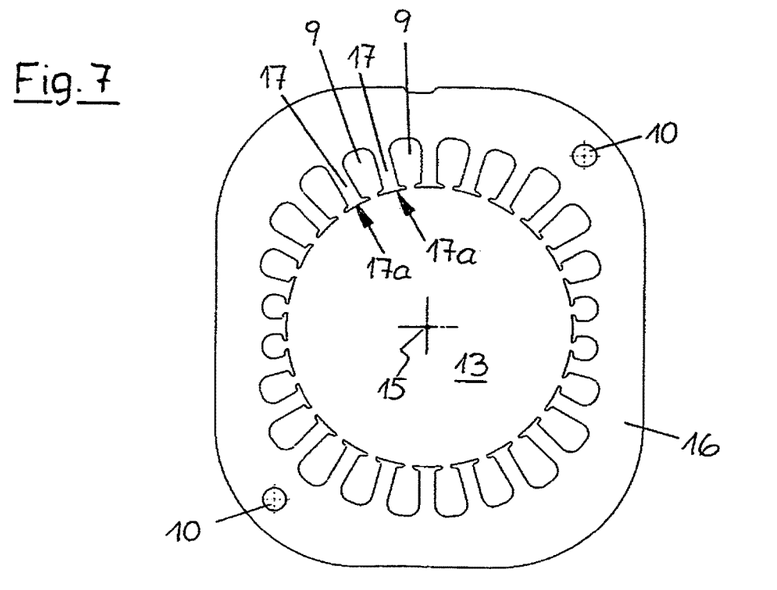
FIG. 7 shows an alternative design of the stator segment in a top view.
Figure 8:
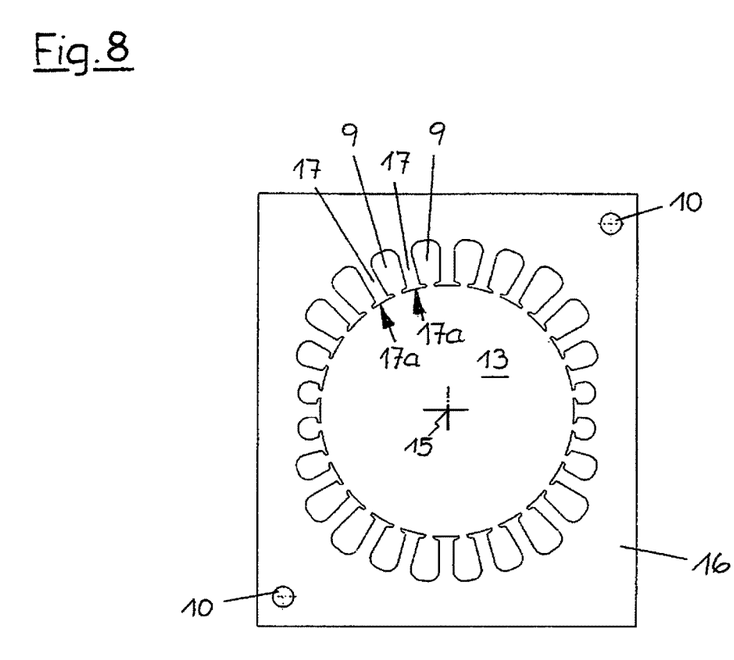
FIG. 8 shows a further alternative design of the stator segment in a top view.

According to the present exemplary embodiment, the peripheral course of the insulating element 7 shown in FIG. 5 extends essentially congruently with the peripheral course of the stator segments 16, i.e., the cross-sectional geometry of the coil core 8, shown in FIGS. 6 through 8. Thus, analogously to the geometry of the stator segments 16, the insulating element 7 has a plurality of spoke-shaped insulating element teeth 18 which are oriented toward the central stator bore 13 and which constitute the receiving grooves 9, whereby in the installed position the insulating element teeth 18 or the end regions 18a thereof extend essentially congruently with the segment teeth 17 or the end regions 17a thereof in order to accommodate the windings or winding stacks of the main field and auxiliary field windings 11, 12.

The insulating element 7 has an arbitrary number of projecting, preferably foldable, additional insulating sections 14 in a peripheral edge region 7a opposite the stator bore 13 which insulate the winding heads 11', 12' of the stator winding 11, 12 with respect to adjacent sections of the cylinder housing 26, in particular with respect to the previously mentioned flange extensions 27 of the cylinder housing 26 which surround the winding heads 11', 12' and which may be attached to the coil core 8.

With reference to FIG. 17, which shows a partial sectional view according to line A-A based on a top view of the electric motor-cylinder housing system illustrated in FIG. 16, it is seen how the insulation distance of the winding heads 11', 12' from the flange extensions 27 of the cylinder housing 26 which may be attached to the stator coil core 8 may thus be greatly reduced in comparison to conventional systems.

Figure 21:
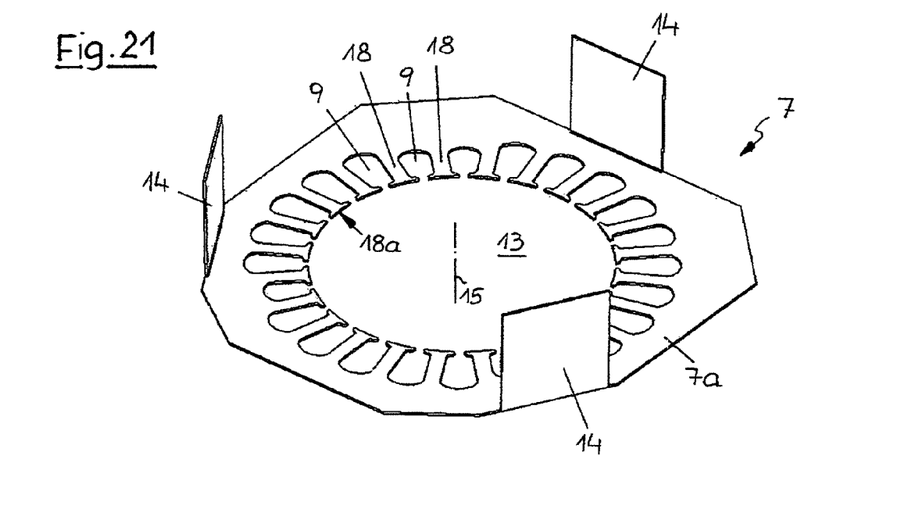
FIG. 21 shows a preferred embodiment of the insulating element with three additional insulating sections, in an oblique view.

In the present exemplary embodiment, the winding heads 11', 12' facing the upper end face 22 are surrounded by three cylinder housing flange extensions 27; i.e., each stator segment 16 has three corresponding receiving holes 10. A corresponding insulating element 7 having three additional insulating sections 14 is illustrated in FIG. 21.

In one particularly preferred design variant, the stator segments 16 each have only two receiving holes 10, whereas the cylinder housing 26 has two integrally molded flange extensions 27 which are provided with threaded (blind) boreholes 25 which correspond to the stator segment receiving holes 10. A corresponding insulating element 7 having only two additional insulating sections 14 is illustrated in FIG. 5 (also see a corresponding insulating element 7 in the installed position according to FIGS. 18 and 19).

Figure 20:
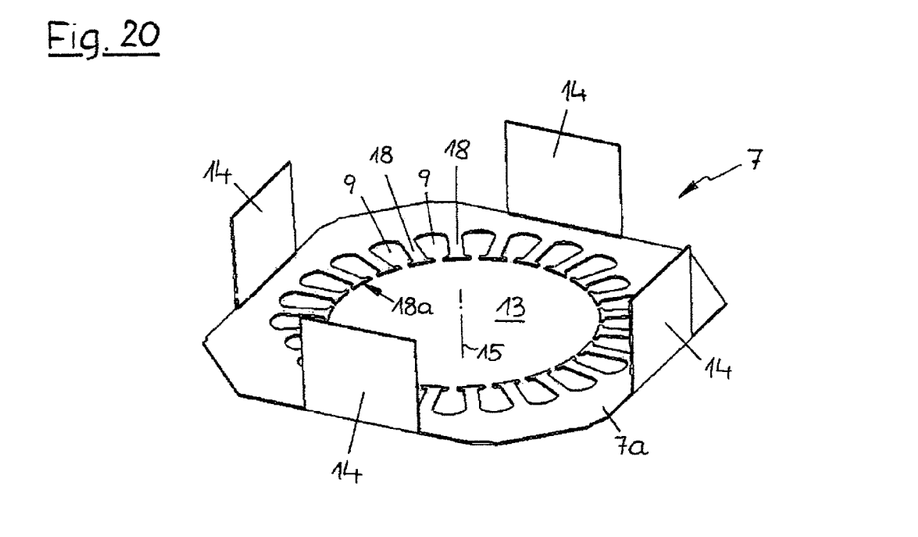
FIG. 20 shows an insulating element and four additional insulating sections, in an oblique view.

Of course, an insulating element 7 may also have four additional insulating sections 14 in order to insulate the winding heads 11', 12' with respect to a cylinder housing 26 which is provided with four flange extensions 27 in the conventional manner (see FIG. 20).

The receiving holes 10 and therefore the corresponding cylinder housing flange extensions 27, i.e., the additional insulating sections 14 of the insulating element 7, preferably are each situated in a corner region of the coil core 8, as shown in FIG. 2, for example.

The additional insulating sections 14 are preferably designed as one piece with the insulating element 7, and may be connected to the insulating element 7 by a predetermined bending edge, but may also be fabricated separately and subsequently attached to the insulating element 7. In the present exemplary embodiments according to FIGS. 5, 20, and 21, the additional insulating sections 14 are designed as tab elements which are bent out from the insulating element 7 and have an essentially rectangular shape.

However, it is understood that many adaptations of the additional insulating sections 14 according to the invention corresponding to a particular cylinder housing geometry are possible, for example circular or polygonal as well as convex or concave shapes, without departing from the inventive concept.

Figure 19:
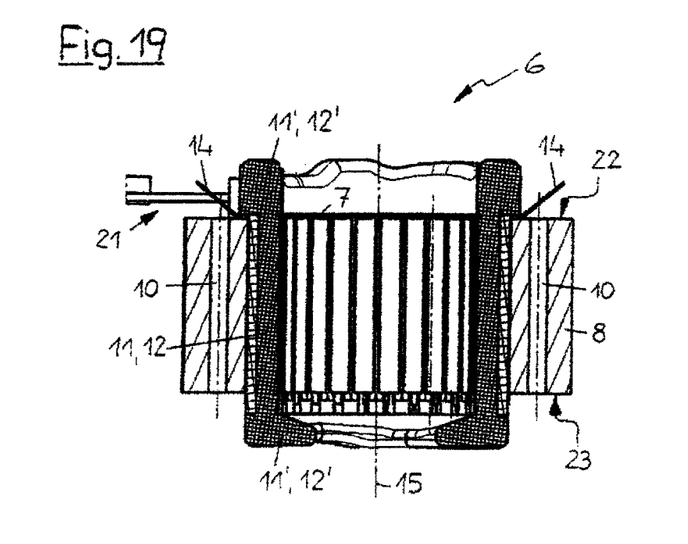
FIG. 19 shows a stator provided with an insulating element and two additional insulating sections according to section line B-B from FIG. 18 (without the cylinder housing)

As shown in a sectional illustration of the stator 6 according to FIG. 19, the additional insulating sections 14 project at an angle of approximately 45° from the insulating element 7, which is situated essentially horizontally in the installed position, and are not bent upward in the direction of the cylinder housing 26 until the cylinder housing 26 is mounted on the stator 6 in order to remain in an end position according to FIG. 17, extending essentially at right angles to the upper coil core end face 22. In this end position the additional insulating sections 14 thus extend essentially parallel to an inner side 30 of the flange extensions 27 of the cylinder housing 26 which faces the winding heads 11', 12', and shield the latter from the surrounding region of the winding heads 11', 12'.

To achieve such a motion or folding capability of the additional insulating sections 14 situated on the insulating element 7, the additional insulating sections may have a predefined hinge region, for example in the form of a notched bending edge.

The invention claimed is:

1. A refrigerant compressor comprising:
a) a compressor housing;
b) a cylinder housing comprising a piston disposed in the compressor housing; and
c) an electric motor driving the piston, said electric motor comprising a stator disposed in the compressor housing and fastened to the cylinder housing, said stator having a stator bore, a coil core having a plurality of receiving grooves, and a stator winding received in the receiving grooves, said stator winding comprising a plurality of windings, coil groups, and poles;
wherein the piston compresses a refrigerant;
wherein the coil core comprises a plurality of interconnected stator segments, a first end face and a second end face;
wherein the stator winding comprises winding heads near the first end face or the second end face, each of said winding heads being situated outside the receiving grooves;
wherein an insulating element covers the first end face or the second end face and insulates the winding heads with respect to the coil core;
wherein the insulating element has a plurality of projecting insulating sections extending from a peripheral edge thereof opposite the stator bore, said insulating sections insulating the winding heads situated on the first end face or the second end face with respect to adjacent sections of the cylinder housing; and
wherein the winding heads of the stator winding are pressed against the insulating element.

2. The refrigerant compressor according to claim 1, wherein the insulating element essentially has a plate-shaped design.

3. The refrigerant compressor according to claim 1, wherein the peripheral course of the insulating element is essentially congruent with the peripheral course of the coil core or the stator segments.

4. The refrigerant compressor according to claim 1, wherein the insulating sections are situated so as to be movable on the insulating element.

5. The refrigerant compressor according to claim 1, wherein the insulating sections are designed as one piece with the insulating element.

6. The refrigerant compressor according to claim 1, wherein the insulating element or the insulating sections are made of PET.

7. The refrigerant compressor according to claim 1, wherein the cylinder housing has four or three or two flange extensions which may be fastened or screwed to the coil core and which may each be insulated from the winding heads by an insulating section of the plurality of insulating sections.

8. The refrigerant compressor according to claim 1, wherein the insulating element or the insulating sections have a layer thickness of <2 mm.

* * * * *